Fig. 4

W. J. BOHAN.
SELF INTRENCHING SUBSURFACE LAND TORPEDO.
APPLICATION FILED DEC. 3, 1917.

1,388,545.
Patented Aug. 23, 1921.
6 SHEETS—SHEET 4.

Witnesses
A. H. Opsahl
H. L. Opsahl.

Inventor
W. J. Bohan
By his Attorneys
Williamson Merchant

W. J. BOHAN.
SELF INTRENCHING SUBSURFACE LAND TORPEDO.
APPLICATION FILED DEC. 3, 1917.

1,388,545.  Patented Aug. 23, 1921.
6 SHEETS—SHEET 5.

Witnesses
A. H. Opsahl
H. L. Opsahl

Inventor
W. J. Bohan
By his Attorneys
Williamson & Merchant

UNITED STATES PATENT OFFICE.

WILLIAM J. BOHAN, OF ST. PAUL, MINNESOTA.

SELF-INTRENCHING SUBSURFACE LAND-TORPEDO.

1,388,545. Specification of Letters Patent. Patented Aug. 23, 1921.

Application filed December 3, 1917. Serial No. 205,087.

*To all whom it may concern:*

Be it known that I, WILLIAM J. BOHAN, a citizen of the United States, residing at St. Paul, in the county of Ramsey and State of Minnesota, have invented certain new and useful Self - Intrenching Subsurface Land-Torpedoes; and I do hereby declare the following to be a full, clear, and exact description of the invention, such as will enable others skilled in the art to which it appertains to make and use the same.

In modern warfare, the fighting, at the contested front, is largely done by soldiers in and from the trenches; and the front trench lines of the opposing enemies are usually not far apart. According to prevailing reports, in respect to the present war, it would seem that the front trenches of the opposing armies are seldom located more than five hundred yards apart, and are often as close together as two or three hundred yards. Regardless of the danger from bullets, bombs, shells, fire or gas, the intermediate space, or so-called "No man's land" is usually difficult to get over, either with men or machines; for the reasons that both lines of opposing trenches are usually barricaded with wire and other entanglements and, after the contest has continued for any considerable period, the intermediate ground becomes pitted with shell holes, and otherwise so torn to pieces and littered that it is almost impassable for men or machines.

Moreover, any surface traveling implements of warfare cannot well be concealed from the watchful eyes of the enemy; and it follows therefrom, that it is difficult or impossible to get the benefit of the needed secrecy for the advance placement of such machines and the needed surprise in the actual attack.

My invention has for its primary object to provide a destructive instrument of land warfare, which will be independent of any and all surface obstructions, and, at the same time, will enable the utilization of the needed secrecy in the advance preparation and placement thereof and give the great advantage of surprise in the attack.
To these ends, I provide a mole-action or self - intrenching subsurface land torpedo, adapted to bore its own way through the ground, under control from a distant base, and to be exploded, at will, after it reaches the desired point of attack, the distance of travel being automatically recorded and indicated at the base of control.

Preferably, the machine is propelled by an electric motor, carried on the interior of its frame, and provided with circuit connections, for the supply of current from a distant source, and which circuit connections are always maintainable, throughout the travel of the machine under the ground, and have controllers at the operating base. An electric igniter is provided for the explosive charge stored within the frame of the machine, and which igniter has circuit connections also always maintainable, throughout the travel of the machine, and having a controller at said base of control. An electric distance recorder is also preferably located at said base of control, and the machine carries an automatic controller for these circuit connections, which connections are also always maintained throughout the travel of the machine, and, by which means, the distance of the machine's travel, is automatically recorded and constantly indicated to the observer, at the base of control. The necessary sets of wires for the said electric motor and other electric devices, hereinbefore referred to, are carried in a suitable insulating cable, mounted within the frame of the machine, and paid out from the rear thereof, as the machine bores its way through the ground.

The machine has a non-rotative hollow main frame, adapted to house the explosive charge, the electric motor, the other electric devices, and the trains of reduction gears and transmitting devices, by which motion from the shaft of the motor is communicated, with reduced speed and increased power, to the excavating and propelling mechanism supported on the exterior of this frame.
This excavating and propelling mechanism includes an excavating screw, rotatively mounted on the front end of said frame, a packing screw, rotatively mounted on the rear end of said frame, and intermediate dirt-conveying and traction mechanism, preferably in the form of four sets of toothed endless-chains, traveling lengthwise of said frame, and which, among other things, are adapted to receive the excavated material from the forward or excavating screw and deliver the same to the rearward or packing screw by which this excavated material is forced back into that part of the excavated hole or path, through which the machine has passed. In this rearward travel of said chains, the teeth of the same engage with the earth walls of the hole, excavated by the forward screw, and the bottom members of said chains are subject to the weight on the central part of the frame of the machine, and, therefore, afford large traction. The two screws have reverse threads and rotate in opposite directions, the forward screw tending to pull the machine forward, and the rear screw to push it forward, and all the said rearwardly traveling toothed chains, reacting against the earth walls, coöperate with these said two screws in the propelling action on the machine. The central part of the main frame is of rectangular form in cross section, affording the needed four plane-guiding surfaces for the four sets of said chains, and this shape of the central part of the frame, taken together with the disposition of said four sets of chains and the weight from said central part of said frame on the bottom set of said chains, keeps this central part of the machine from rotation, while the two screws mounted thereon are forced to rotate around the same in opposite directions at its opposite ends. The proportions of the trains of reducing gears and power transmitting devices, relative to the normal speed of the motor shaft, should preferably be such as to cause the excavating and propelling mechanism to move the machine forward, at the rate of about one foot per minute. The dirt-conveying chains are provided with self-clearing devices, at their points of delivery to prevent clogging thereof.

The machine is comparatively small, preferably about eight feet in length and 18 to 24 inches in diameter, and a ten H. P. motor is deemed sufficient to operate the same. The frame and the screws are preferably made of cast steel, or from malleable iron case-hardened, and the motor and gearing and the other equipment may be of standard forms, available on the market. The machine can, therefore, be produced at low cost, compared with the standard water torpedoes,—in fact, at a mere fraction of the cost thereof.

Of course, the machine is not adapted to work through stratified rock or ground full of large boulders, such as are frequently found in glacial drift soil, but is is thought that the machine will work with entire success in all other classes of soil, such, for example, as sand, gravel, loom, clay, or chalk. In other words, the machine will work successfully in most soils, wherein the soldiers are able to dig their own trenches.

The machine is intended to be started, under ground, from a pit, with the machine pointed in the proper direction and set at the proper level for the desired travel to the place of attack, and, in virtue of the length and shape of the machine, and the character of its coöperative excavating and propelling mechanism, it is thought that the machine will maintain its set course with sufficient precision for its intended use. It, of course, may be started and set, so as to travel at any desired depth below the surface.

From the foregoing, it should be clear that a battery, containing any desired number of these self-intrenching torpedoes, could be positioned secretly, in advance, at the margins of the enemies' trenches, or other fortifications, properly spaced apart along any desired length of front, and then subsequently, at the desired opportune moment, to the surprise of the enemy, be simultaneously exploded by one or more operators, at the base or bases of control; and, it is, of course, obvious that the destruction in and about the enemies' trenches or fortifications would be something enormous. The machine, itself, would, of course, also be destroyed, as other torpedoes are.

I am, of course, well aware that, if the explosive charge and its igniting and controlling mechanism was eliminated, the remaining mechanism would constitute a self-intrenching machine, capable of other repeated serviceable uses. For example, it might be used in the warfare field, or other fields of action, for laying electric wires, or possibly small pipes under ground, by having pits or other outlets available at the ending points, as well as the starting points of the machine's travel.

As hereinbefore stated, however, my primary purpose is to provide a self-intrenching subsurface land torpedo, and the invention, in its preferred form, is illustrated as organized for that purpose, in the accompanying drawings.

In view of the foregoing general statements, it is thought that it will be easy to follow and understand the detailed specification of the mechanism, which will now be given.

In said drawings, wherein like reference notations refer to like parts throughout the several views.

Figs. 10ª and 10ᵇ are details partly in section showing conveying chains and clearing devices.

Figures 10, 10A, 10B, 11:
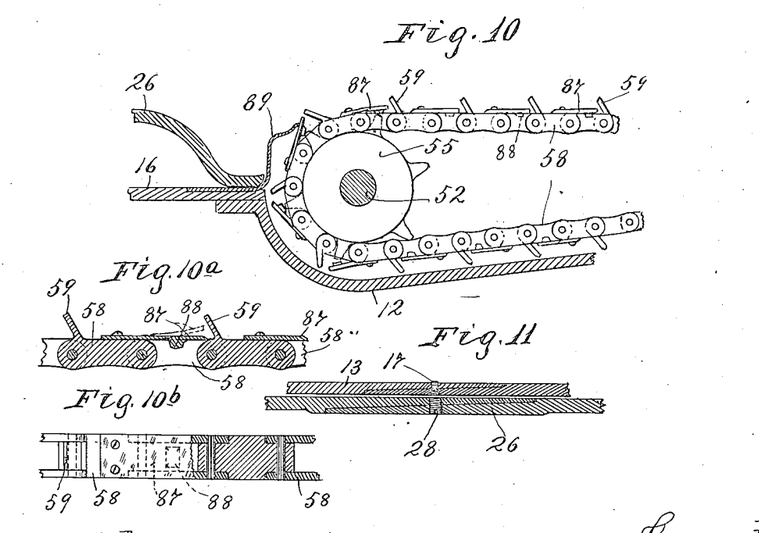
Fig. 10 is a detail in vertical section of Fig. 9, but showing the top set of conveying chains in working positions.
Fig. 11 is a detail, on a larger scale than in Fig. 3, showing in section the detachable telescopic connections between the rear sections of the rear portion of the hollow body frame and between the hollow sections of the rearward or packing screw.

The hollow body frame is in the form of a strong cast metal shell and is made up chiefly of a main portion 12 nearly central of the machine, that is rectangular in cross section, and a rear portion 13 that is approximately cylindrical but slightly tapered and closed at its rear end and terminated in a bearing hub 14. The chambers of the two sections 12 and 13 are divided by a strong fixed partition 15 that has a forwardly projecting gear-housing annular flange 16, the front edge of which is of cylindrical form and is telescoped into and rigidly secured to a correspondingly formed rear end flange of the frame section 12 (see particularly Fig. 3ᵇ). To afford access to the chamber within the rear frame section 13, the cylindrical shell thereof is formed in two sub-sections telescoped together, as best shown in Fig. 11, and rigidly connected by a multiplicity of screws 17.

The front end of the frame section 12 is expanded and terminated in a cylindrical flange 18 (see Fig. 3ª), for a purpose which will presently appear. In Fig. 3ª of the drawings, is shown an electric motor, the exterior casing 19 of which is rigidly secured to the front end portion of the frame section 12 and which motor has an extended shaft 20, which shaft, at its rear end, is suitably journaled in the hub portion of the frame partition 15 (see Figs. 3ª and 3ᵇ). The motor shaft 20 also projects forward some distance. The forward excavating screw 21 has a main body portion that is cylindrical, but its front end portion is tapered or made approximately conical throughout with its nose portion elongated. On its exterior, this hollow excavating screw 21 is provided with spiral threads or excavating blades 21ª, (shown as right-hand threads) that extend from the point to the extreme rear thereof. This hollow excavating screw 21 is mounted to rotate around and forms an inclosing casing for the motor 19 and certain other parts hereinafter to be noted; and as shown, this is accomplished as follows:

The motor casing 19 is shown as provided with two surrounding annular bearing rings 22 for rollers 23 mounted to run thereon and support internally channeled annular bearing rings 24, which latter are rigidly secured to the interior of the said hollow screw 21. Here it may be stated that the parts 22, 23 and 24 will be first assembled and then the excavating screw 21 will be telescoped over the same and the bearing rings 23 will be thereafter rigidly secured to the said excavating screw by means of a plurality of machine screws, or the like. Here it should be also noted that the rear end of the excavating screw 21 is telescoped over and rotated around the cylindrical frame flange 18 in close contact therewith. The front end portion of the screw 21 is provided with an internal hub 25 that is journaled on the extreme front end of the motor shaft 20, preferably by an antifriction thrust resisting device.

The rearward or packing screw 26 is also a hollow structure and the main body portion thereof is cylindrical. It is mounted to revolve around the rear section 13 of the hollow main frame and its rear end is tapered approximately conical and terminates in an axial sleeve 27, the front end of which is journaled in the rear end bearing hub 14 of said frame section 13 and which sleeve turns around a hollow cable guiding stud shaft 14ª integral with said hub 14. The extreme front end of this tubular packing screw 26 is contracted and closely engages the front portion of the cylindrical flange 16 of the frame partition 15. On its exterior, the said packing screw 26 is provided with external conveying and packing threads or spiral blades 26ª (shown as left hand threads). To make it possible to assemble the packing screw 26 over the hollow frame section 13, it, like the said main frame section 12, is made in two parts united by a telescoping joint (see Fig. 11) and rigidly connected by a plurality of screws 28.

Antifriction bearing devices are interposed between the tubular frame section 13 and the tubular packing screw 26; and, as shown, this is accomplished by providing the said frame section 13 with external roller bearing channels 29 for rollers 30 that work in and support internally channeled bearing rings 31 that snugly fit the interior of the said tubular packing screw 26 and are fixed thereto. Said channeled bearing rings 31 will be split, like the packing rings of a piston, so that they are adapted to be sprung into the channels 29, around the bearing rollers, and they are adapted to be rigidly secured to the said packing screw after the parts are assembled, as shown in Fig. 3$^b$, by means of small screws or other suitable devices, not shown. When the said channeled rings 31 are thus assembled and secured to the packing screw 26 they securely hold the latter aginst axial movements on the inclosed tubular frame section 13.

Figure 3A:
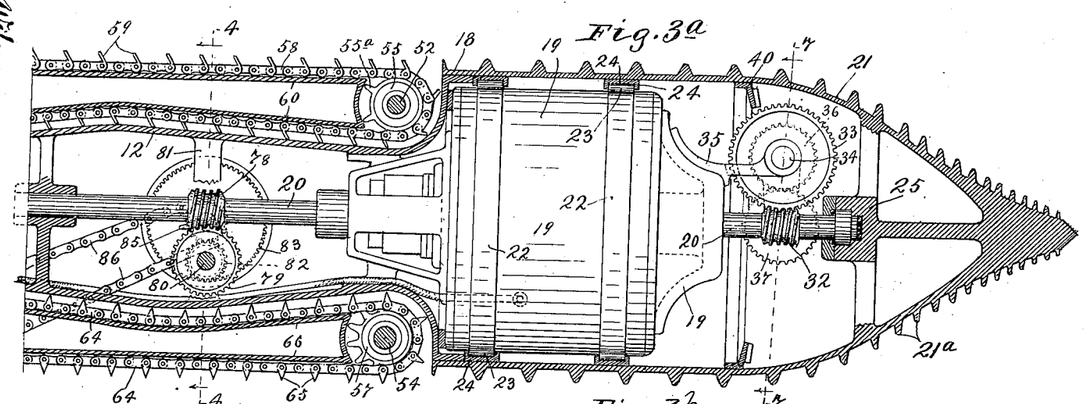
Figs. 3ª and 3ᵇ are supplemental views showing the torpedo in vertical axial section, said view 3ª indicating the forward half and 3ᵇ the rear half of said torpedo.
Figure 3B:
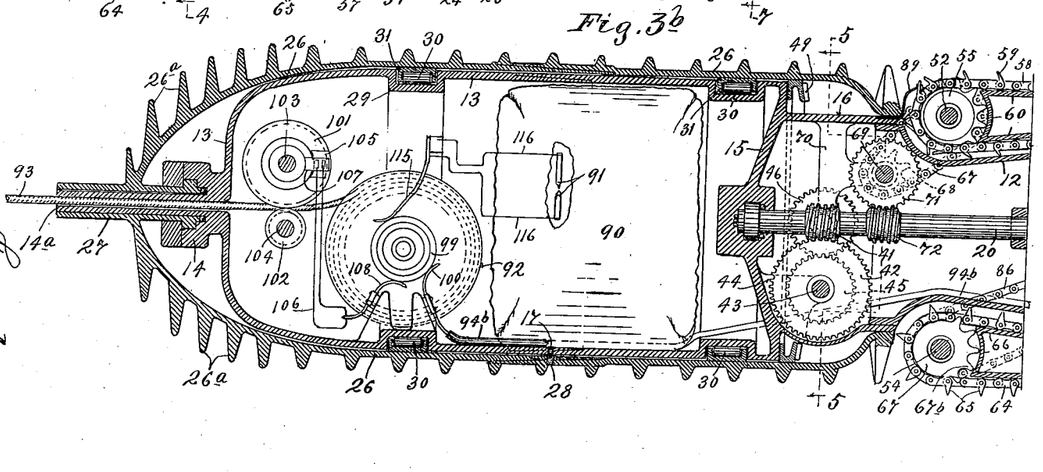
Figure 7:
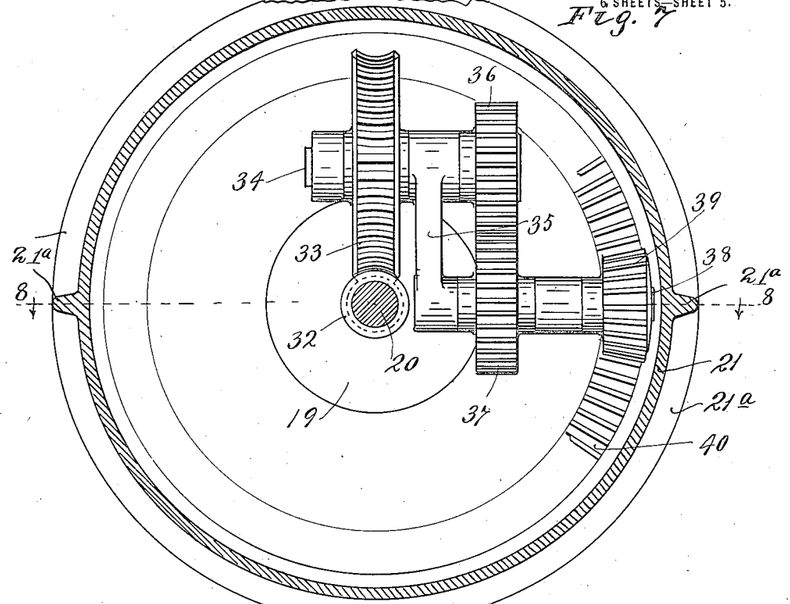
Fig. 7 is a transverse vertical section taken through the torpedo on the line 7—7 of Fig. 3ª.
Figure 8:
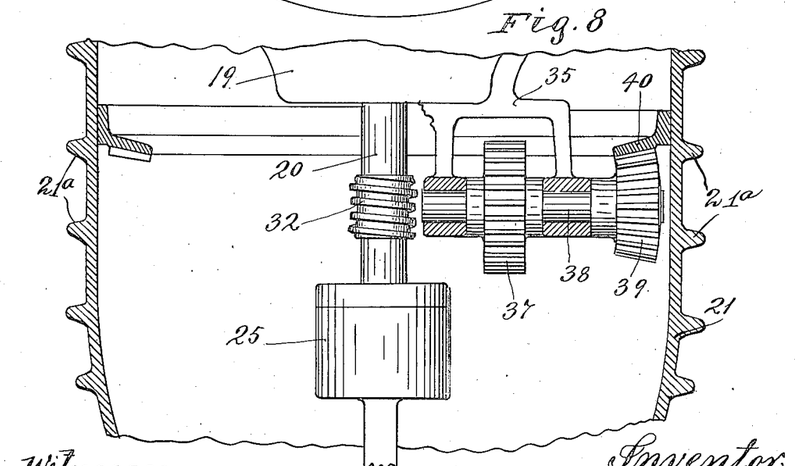
Fig. 8 is a horizontal section taken approximately on the line 8—8 of Fig. 7, some parts being broken away and some parts being shown in full.

The excavating screw 21 is given a slow rotary movement, from the motor shaft 20, through the following connections (see particularly Figs. 3$^a$, 7 and 8). The motor shaft 20 is provided with a forward worm 32 that engages an overhanging worm gear 33 secured to a short shaft 34 journaled in a bearing bracket 35 rigidly secured on the front end portion of the motor casing 19. The shaft 34 carries a spur gear 36 that meshes with a similar spur gear 37 secured to another short shaft 38 that is journaled in an extension of the bracket 35. At its outer end, the shaft 38 is provided with a beveled pinion 39 that meshes with a large annular beveled gear 40 that is rigidly secured to the interior of the excavating screw.

Figure 5:
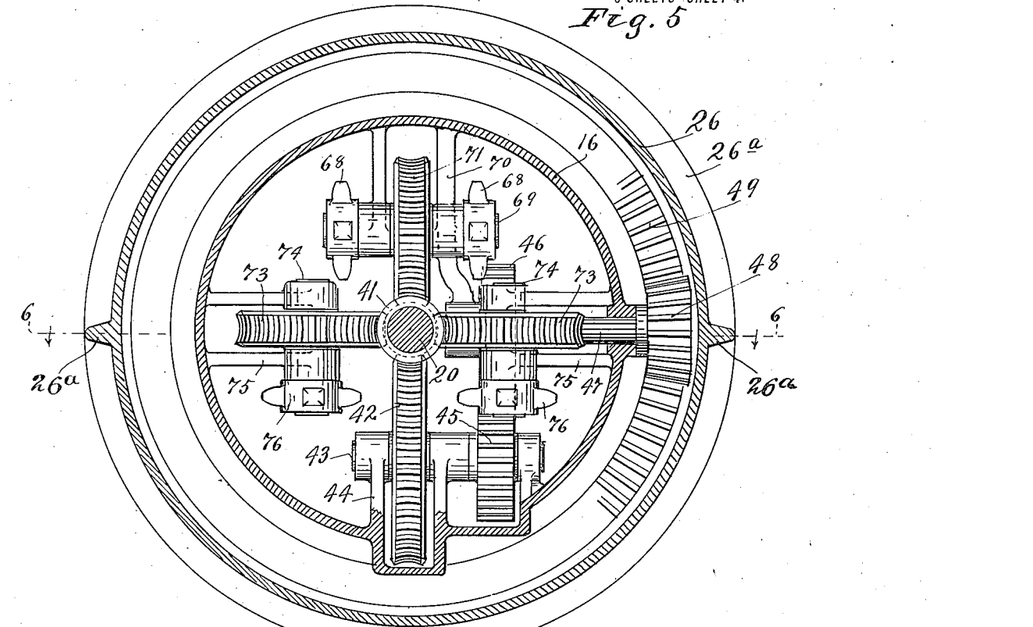
Fig. 5 is a transverse vertical section taken through the torpedo on the irregular line 5—5 of Fig. 3ᵇ, some parts, such as the worm gears, being shown in full but partly in diagram.
Figure 6:
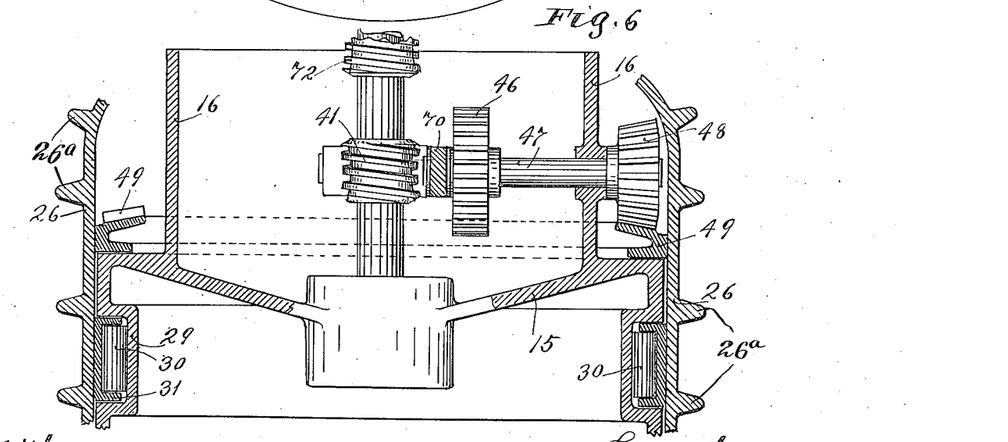
Fig. 6 is a horizontal section on the line 6—6 of Fig. 5, some parts being broken away, some parts removed and some parts being shown in full.

The packing screw 26 is rotated through the following connections (see Figs. 3$^b$, 5 and 6). Near its rear end, the motor shaft 20 is provided with a worm 41 that engages an underhanging worm gear 42 secured to a short shaft 43 journaled in lugs 44 on the frame partition 15. Shaft 43 carries a spur gear 45 that meshes with an overlying spur gear 46 secured on a radial shaft 47 that is journaled in one of the lugs 44 and is extended through and journaled in one side of the casing flange 16, (see Fig. 6). At its outer end, the shaft 47 is provided with a beveled pinion 48 that meshes with an annular beveled gear 49 that is rigidly secured to the interior of the tubular packing screw 26. The annular gear 49 is adapted to be rigidly secured to the tubular packing screw 26, after the parts have been assembled, by means of screws or other suitable devices, not shown. From the foregoing, it follows that the two screws 21 and 26 must turn in opposite directions at relatively low speeds compared to the speed of the motor shaft 20.

The forward section 12 of the hollow main frame has been described as of substantially rectangular cross section and that statement is true in respect to its main or central portion. However, it is formed, at its upper corner portions, with longitudinal outwardly extended hollow segmental brackets 50 (see particularly Figs. 1 and 4), and at its lower corners with downwardly projecting longitudinal brackets 51. Journaled to the front and rear end vertical portions of the brackets 50 are upper horizontal shafts 52; journaled to the front and rear horizontal portions of the brackets 50 and 51 are upright side shafts 53; and journaled to the downwardly depending front and rear portions of the bottom brackets 51 are lower horizontal shafts 54. Secured to and rotatable with the front and rear upper shafts 52 are long sleeve-like sprocket hubs 55 (see Fig. 3$^b$) provided with a multiplicity of laterally spaced sprockets 55$^a$ and 55$^b$ (see Fig. 4). Secured on and rotatable with the upright front and rear side shafts 53 are long sleeve-like sprocket hubs 56 provided with vertically spaced sprockets 56$^a$ and 56$^b$ (see Fig. 4). Mounted on and rotatable with the front and rear lower shafts 54 are long sleeve-like sprocket hubs 57 provided with laterally spaced sprockets 57$^a$ and 57$^b$ (see Fig. 4). Running over the front and rear upper horizontal sprockets 55$^a$ are suitably spaced endless conveying top chains 58, the alternated links of which are provided with projecting blade-like teeth 59. These chains 58 run both over and under a horizontal deck 60 which, as shown, is made hollow and cast integral with the brackets 50, but which might, nevertheless, be otherwise formed.

Running over the front and rear vertical sprockets 56$^a$ are suitably spaced conveying side chains 61, which, like the top chains 58, are provided with projecting blade-like teeth 62. These side chains 61 run around vertical decks 63 which, as shown, are hollow and cast integral with the brackets 50 and 51, but might, nevertheless, be otherwise formed.

Running over the front and rear lower horizontal sprockets 57$^a$ are combined traction and conveying chains 64 which have projecting blade-like teeth 65 on their alternate links. These chains 64 run under and over a horizontal deck 66 which, as shown, is made hollow and cast integral with the brackets 51, but might, nevertheless be otherwise formed.

The top conveying chains 58 are driven as follows:

Short sprocket chains 67 run over the sprockets 55$^b$ and over sprockets 68 (see Figs. 3$^b$ and 5), carried by the ends of a short interior shaft 69 mounted in suitable bearing brackets 70 on the frame flange 16. Secured to the central portion of shaft 69 is a worm gear 71 that meshes with a worm 72 secured to the motor shaft 20. The sprocket chains 67, of course, run through suitable clearance passages formed in the top of the rear portion of the frame section 12.

Figure 9:
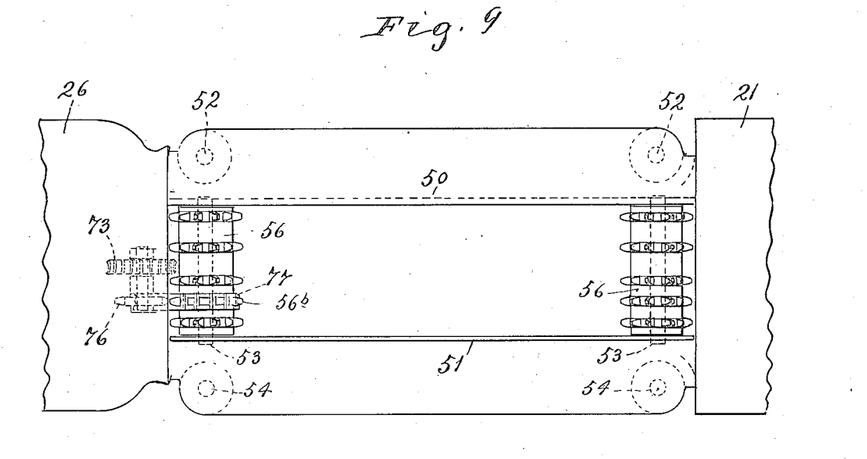
Fig. 9 is a side elevation of the central portions of the main frame, etc., with the conveying and traction chains removed and other parts broken away.

The side conveying chains 61 are driven from the same above noted worm 72, through horizontally and oppositely disposed worm gears 73 (see Fig. 5). These worm gears 73 are secured to short upright shafts 74 journaled in suitable bearings 75 on the interior of the frame section 12. At their lower ends, the shafts 74 are provided with sprockets 76. Sprocket chains 77 (see Fig. 9) run over the sprockets 76 and over the sprockets 61$^b$ of sprocket hubs 56. The sprocket chains 77 run through suitable clearance passages in the sides of the rear portion of the frame shell 12.

Figure 4:
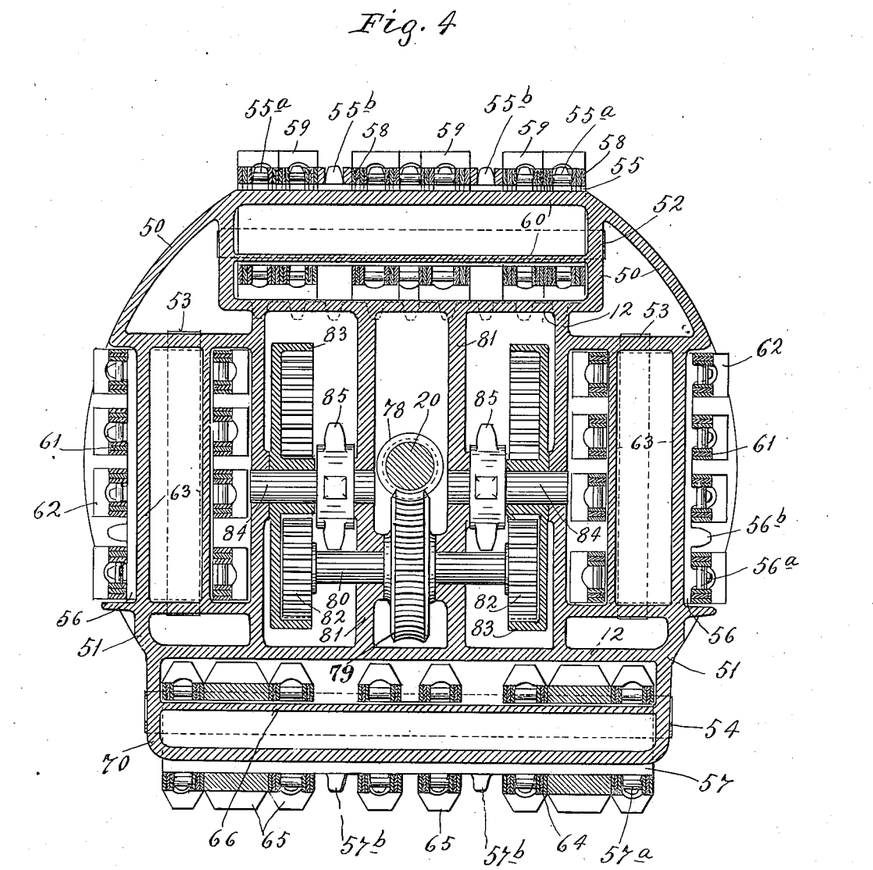
Fig. 4 is a transverse vertical section taken through the torpedo on the line 4—4 of Fig. 3ª.

The lower or combined traction and conveying chains 64 are driven through the following connections:

The motor shaft 20 is provided, near the rear of the motor, with a worm 78 that meshes with a worm gear 79 (see Figs. 3$^a$, 3$^b$ and 4) that is secured to the central portion of a transverse lower shaft 80 journaled in vertical interior flanges 81 of the frame section 12. At its outer ends, shaft 80 is provided with spur pinions 82 that mesh with internal gears 83 carried by short axially alined and transversely spaced radial shafts 84 that are journaled in the flanges 81 and in the sides of the frame section 12. Said shafts 84 carry sprockets 85. Two long driving sprocket chains 86 run over the sprockets 85 and over the sprockets 57$^b$ of the sprocket sleeve 57 fixed to the rear member of the bottom shafts 54.

Through the connections just above described, the top set of chains 58, the side sets of chains 61 and the bottom set of chains 64 will be driven in such directions that their outer or tooth bearing faces are moved rearward. The said top and side sets of chains will be driven preferably at the same speed and at a higher rate of speed than the torpedo will travel through the ground, but the lower set of chains 64 will be driven at a relatively slow speed, to wit, at a speed not much, if any, greater than the speed of travel of the torpedo through the ground. Hence, the top and side sets of said chains perform the main rearward dirt conveying action, from the excavating screw to the packing screw, while the lower set of chains 64 serve chiefly to assist the screws in effecting the forward travel of the torpedo, and the traction available therefor is greatly increased from the fact that the weight of the central part of the machine rests thereon. The top and side chains, however, also assist, in this propelling action, to the extent that their rearwardly moving teeth react against the adjacent walls of the hole opened by the forward excavating screw 21.

Preferably, all of the conveying chains, to wit, the top chains 58, side chains 61 and bottom chains 64, are, in practice, provided with self-cleaning devices of the character shown in detail in Figs. 10$^a$, 10$^b$ and 11. In the drawings, however, these self-cleaning devices are shown as applied only to the top conveying chains 58.

Described in detail as applied to the said top chains 58, the self-cleaning devices comprise spring blades 87 riveted, or otherwise rigidly secured, at one end, to the adjacent solid link of the said chains 58, with their other or free ends working close to the faces of the adjacent chain teeth 59. These spring blades 87 are provided with inwardly pressed or projecting bosses 88, which, as the chain passes over its supporting sprocket wheels, are engaged by the teeth thereof and pressed outward, as indicated by dotted lines in Fig. 10$^a$, and by full lines in Fig. 10. When these cleaning blades 87 are pressed outward, they force outward and dislodge any dirt or mud which may be stuck to the teeth 59 of the said chains, and thus prevent the space between the said teeth from accumulating sufficient dirt or mud to interfere with the conveying actions of the chains. Moreover, (see Fig. 10) as the blades 87 are pressed outward by the sprocket teeth, to produce the above cleaning action, at the delivery end of the chains, they are forced against the upper edge of a scraper 89 which is secured to the upper front edge portion of the frame flange 16 (see also Figs. 3$^b$ and 10). This scraper 89 not only scrapes the dirt from the cleaning blades, but assists in directing the dirt to the front end of the packing screw 26.

A cartridge, or other suitable container 90, loaded with a charge of suitable high explosive material, is fixedly supported within the forepart of the rear end main frame section 13 and, as shown, the charge has therein, a pair of spark gap electrodes 91 which form part of the exploding circuit connections controllable from the distant base.

Mounted in suitable bearings in the rear portion of the hollow frame section 13 is a large cable containing spool or drum 92, upon which is normally wound an insulating cable 93 that contains three pairs of insulated circuit wires 94, 95 and 96. The cable 93 which contains the said wires is extended from the drum outward and rearward through the hollow projecting stud shaft 14$^a$ and will be anchored, or held against traveling movement, at the base or controlling station, so that as the torpedo moves forward the said cable will be automatically unwound or payed out from the drum 92. Inasmuch as the dirt will be packed tightly around that portion of the cable that is thus payed out from the rear of the torpedo, it is impracticable for a cable of sufficient length (500 or more yards) to be dragged or pulled through the ground with the torpedo, and hence, the necessity for its being payed out from the interior of the torpedo.

The wires 94 constitute a part of the circuit for supplying current to the motor of the torpedo; and, at the controlling station, said circuit is shown as connected to an electric generator 97 whenever the controlling switch 98 is closed. Said circuit wires 94 extend from the inner end of the cable and are connected to contact rings 99 that are insulated from each other and carried by the hub of the cable drum 92 (see Figs. 2 and 3ᵇ). Suitably supported contact brushes 100 constantly engage the contact disks 99, and by insulated circuit wires 94ᵃ, which constitute part of the motor circuit, are connected to the electric motor of the torpedo in the customary way.

These insulated wires 94ᵃ forming part of the motor circuit are contained within an insulated cable 94ᵇ carried on the inside of the machine.

Having regard to the means for automatically indicating the distance of the torpedo's travel, it has already been noted that the main cable 93 carries three sets or pairs of insulated wires marked, respectively, 94, 95, and 96; and as this main cable 93 is payed out, under the forward travel of the machine, it moves between a grooved measuring wheel 101 and a grooved idler 102 having frictional contact therewith, which wheels are journaled on corresponding shafts 103 and 104, suitably supported in the frame section 13. The measuring wheel 101 carries an offset circuit closing contact 105 adapted, at every turn of the said wheel, to cross connect the terminals of a pair of circuit wires 106 carried by an arm 107 mounted on the shaft 103 and held from rotation thereon, but free to slide lengthwise thereof with the wheel 102.

The said circuit wires 106 extend to brushes 108, suitably supported from the frame section 13, in constant contact with a pair of disks 109 on the hub of the cable supporting drum 92, inward of the contact disks 99 hitherto noted. All of the said contact disks are insulated from each other, and the pair 109 are connected, one to each of the respective recording circuit wires 95, carried by the said cable 93 and extending to the electrically actuated recorder 111 and a battery or other source of energy 110 located at the controlling station. This electric recorder 111 may be of any well known or approved type adapted to register the number of times that its actuating circuit is closed. Hence, it is obvious, that with these connections, this recording circuit will be closed every time that the measuring wheel 101 completes a revolution, and hence, its dimension being known, the distance of the travel of the torpedo will be automatically recorded and indicated thereon at the base of control. For example, if said measuring wheel is one foot in diameter and recorder set at zero, before the torpedo starts on its travel, then every foot of travel will be recorded and the total indicated on the recorder.

The cable wires 96 constitute part of the igniting circuit for the explosive charge in the torpedo; and, at their rear ends, said wires 96 are connected to a normally open switch 112 and a battery 113, or other source, at the base of control. From the machine end of the wire-carrying cable 93, said wires 96 are extended and connected to a pair of insulated contact disks 114, located inward of the contact disks 109 on the hub of the drum 92; and a pair of contact brushes 115, suitably supported from the frame section 13, are in constant contact with said disks 114, and, by short insulated wires 116, said brushes are connected to the respective spark gap electrodes 91 within the explosive charge. Obviously, with this arrangement of the connections, the explosive charge may be ignited and exploded, at the will of the operator, at the base of control, by simply shifting the controlling switch 112 into its circuit closing position.

Figures 1, 2:
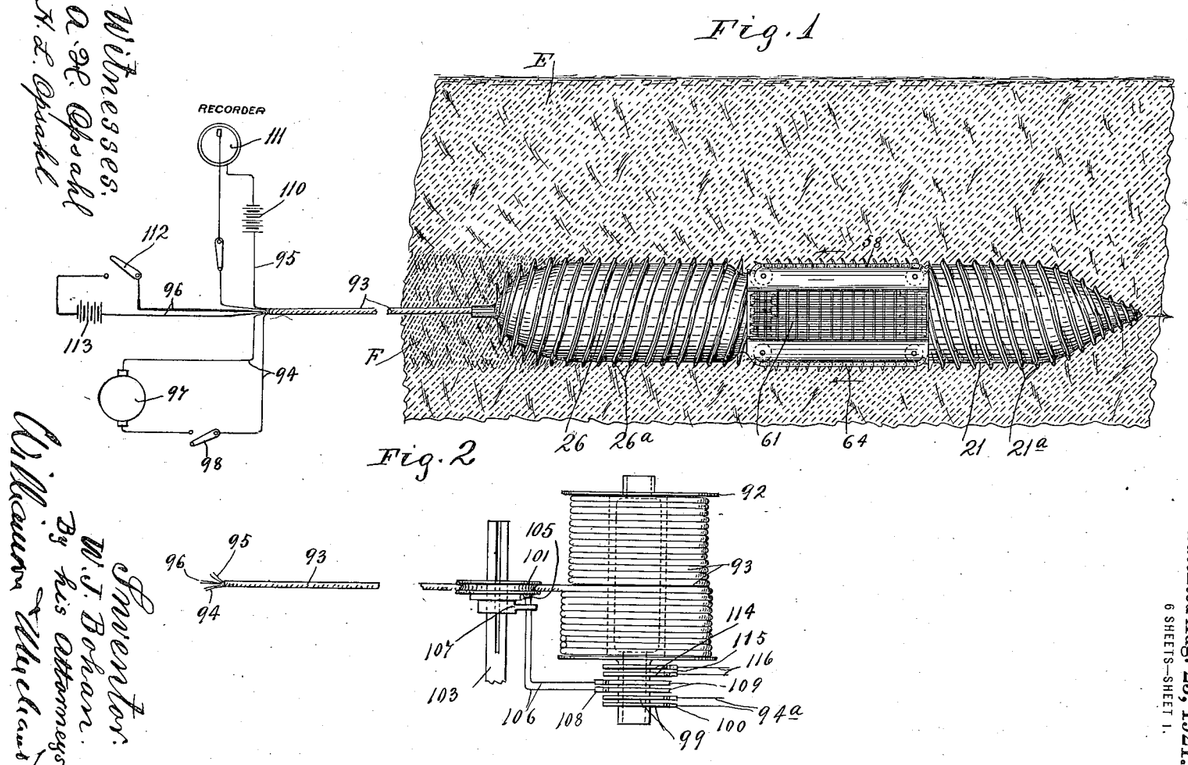
Figure 1 shows the self-intrenching torpedo in side elevation within the earth shown in section and indicates, in diagram, certain of the supply and circuit equipment which is shown as located at the base or controlling station.
Fig. 2 is a plan view showing in detail the cable carrying drum and certain other intimately associated parts removed from the torpedo.

In Fig. 1 of the drawings, the torpedo is represented as working its way through the earth E, at some distance below the surface thereof, and the excavated material, transferred to the rear of the machine and packed back into the hole, through which the machine has passed, is represented by the finer hatching and marked with the reference numeral F.

The general operation of the above specified self-intrenching torpedo has been quite fully stated in the introduction; and it is not deemed necessary to again summarize the general action here. It may be serviceable, however, to make a few further comments as to some of the details of the action.

Inasmuch as the forward excavating screw 21 (with right-hand thread) and the rearward or packing screw 26 (with left-hand thread) are simultaneously rotated about the central part or main frame of the machine at the same speed, but in opposite or reverse directions, (shown by the arrows on Fig. 1), by means of the driving connections above specified, it follows that the reacting torques or torsional strains produced by these two respective screws on the main frame in their respective excavating and packing action, will be opposite and will probably neutralize each other, under most conditions; and it follows that the rotation of the two screws, in these reverse directions, will not produce much, if any, tendency to rotate the central part of the main frame and the mechanism carried thereby, and which central elements constitute what may figuratively be called the "trunk" or "body" of the machine. The rectangular form of this central part of the main frame, in cross section, and the rectangular disposition of the two parallel sets of dirt-conveying and traction chains, on the corresponding four faces of this rectangular frame, as hitherto pointed out, render the entire trunk or central portion of this machine of rectangular form, in cross section, and, moreover, said sets of toothed chains are so mounted that some thereof project, at the corners of the rectangular frame, and, in their rearward movement, the blade-like projecting teeth of the corner members of these chains will engage with the adjacent coves of the solid walls of the cylindrical hole produced by the forward or excavating screw 21. It follows, from these facts, that the square body or trunk portion of the machine will be held, by the walls of the trench, from rotation, while the two screws are forced to turn around the same in opposite directions, as repeatedly before noted. Moreover, this rearward movement of the said sets of toothed chains being a positive one and requiring their blade-like teeth to engage with the solid walls of the trench—especially the bottom members thereof sustaining the weight of the trunk and its load,—the reaction therefrom will tend to propel the machine forward. The dirt excavated by the forward screw 21 is received by said toothed chains and delivered thereby to the rearward or packing screw 26, as hitherto noted, and, under the packing action from said screw 26, said excavated dirt will be tightly packed back into that portion of the hole, through which the machine has already passed, and the reaction from the packing screw will coöperate with the pull from the excavating screw and the reaction from said sets of conveying and traction chains or intermediate mechanism to propel the machine forward. Hence, assuming the motor to have the requisite strength to drive said screws and intermediate coöperative intrenching mechanism, it necessarily follows that the machine must go steadily forward, working its way through the ground and refilling its path behind.

For convenience of diagramming, the respective sources for the current required for the different electric circuits have, in Fig. 1, been shown at the same base of control, where the switches for the different circuits are located; but it will, of course, be understood that the sources, from which the electrical energy is secured, might be at remote points and brought into a suitable switchboard, portable or otherwise, located at the base of control.

I have been advised that electric energy is usually available at the battle front, especially where the trench warfare continues for any considerable time. It is a well known fact that the trenches are usually supplied with electric lights.

It should, perhaps, be noted that no attempt has been made in the drawings to show the different parts proportioned to any exact construction scale; but that some idea of the size of the machine can be had by noting that, in Fig. 1, the aim has been to show the machine, roughly, on about the scale of one half inch to one foot; that in Figs. 3ª, 3ᵇ and 9, the aim has been to show the parts, roughly, on the scale of about one-eighth full size; and that in Figs. 4, 5, 6, 7 and 8, the aim has been to show the parts, roughly, on the scale of about one fourth full size.

It will, of course, be understood that the controlling principles of my invention may be embodied in divers forms of structure. In other words, the details may be widely varied without departing from the spirit of my broad invention.

What I claim is:—

1. A self-intrenching land torpedo having a closed substantially pointed front end and a propelling motor controllable from a distant source.

2. A self-intrenching machine having pointed cylindrical end sections and an electric propelling motor provided with circuit connections controllable from a distant source.

3. A self-intrenching land torpedo having means for excavating its own forward path and for forcing the excavated material to the rear of the machine and into the hole through which the machine has already passed, said means at the front of said machine comprising a closed cylindrical casing.

4. A self-intrenching machine provided with a driving motor and having a forward excavating screw and a rearward packing screw, coöperative to effect the intrenching action.

5. A self-intrenching machine provided with a driving motor and having a forward excavating screw, a rearward packing screw and intermediate mechanism receiving the excavated material from said first named and delivering the same to said last named screw.

6. A motor-driven self-intrenching land torpedo having a driving motor, a forward excavating screw, a rearward packing screw and traction mechanism all driven from said motor and coöperating in the self-intrenching action.

7. A motor-driven self-intrenching land torpedo having a driving motor, a forward excavating screw, a rearward packing screw and endless-chain traction mechanism all driven from said motor and coöperating in the self-intrenching action.

8. A motor-driven self-intrenching land torpedo having a driving motor, a forward excavating screw, a rearward packing screw and intermediate endless-chain dirt-conveying and traction mechanism coöperating in the self-intrenching action.

9. A self-intrenching land torpedo having a driving motor, a rigid central frame provided with means to prevent the rotation thereof, a forward excavating screw rotatively mounted on the forward end of said frame and a rearward packing screw rotatively mounted on the rear end of said frame.

10. A motor-driven self-intrenching land torpedo having a driving motor, a rigid central frame, a forward excavating screw rotatively mounted on the forward end of said frame, a rearward packing screw rotatively mounted on the rear end of said frame and toothed endless-chains traveling lengthwise of said frame on the under surface thereof and subject to the weight therefrom, all of which moving parts are driven from said motor and coöperate in the intrenching action.

11. A motor-driving self-intrenching land torpedo having a driving motor, a rigid central frame of substantially rectangular form in cross section, a forward excavating screw rotatively mounted on the forward end of said frame, a rearward packing screw rotatively mounted on the rear end of said frame and toothed endless-chains arranged in sets on the four faces of said rectangular central frame and moving lengthwise thereof, the bottom member of which sets of chains is subject to the weight of said frame and its load, all of which moving parts receive motion from said motor and coöperate in the intrenching action, substantially as described.

12. A self-intrenching land torpedo having a driving motor, a hollow main frame, a forward excavating screw rotatively mounted on the forward end of said frame, a rearward packing screw rotatively mounted on the rear end of said frame, mechanism intermediate of said screws adapted to receive the excavated material from the forward and deliver the same to said rearward screw and to afford traction to the machine and also coöperative with said frame to prevent the rotation thereof, a propelling motor located on the interior of said frame and means for communicating motion from said motor to said screws and to said mechanism intermediate of the screws at reduced speeds, substantially as described.

13. A subsurface self-intrenching machine having a propelling motor controllable from a distant source, and means including a payed-out cable and a paying out drum therefor to indicate at said controlling source the distance traveled by said machine under the ground.

14. A self-contained, self-intrenching subsurface machine having an excavating device in front, a dirt packing device at the rear, means for transferring the earth from the front to the rear of the machine, a motor carried by said machine, and connections for driving the moving parts of said machine from said motor.

15. A motor-driven self-intrenching machine comprising two spaced cylindrical casings having pointed ends and a center section connecting the same, comprising a series of endless conveyers.

16. A subsurface self-intrenching machine comprising spaced oppositely disposed cylindrical casings having helical conveyer blades thereon and having substantially pointed ends and a central section connecting the same, comprising a series of endless conveyers.

17. A subsurface self-intrenching machine comprising spaced oppositely disposed cylindrical casings having substantially pointed ends, a central section connecting the same comprising a plurality of endless conveyers, and means for rotating said cylindrical casings and driving said endless conveyers housed within said cylindrical casings.

In testimony whereof I affix my signature in presence of two witnesses.

WILLIAM J. BOHAN.

Witnesses:
JAS. F. WILLIAMSON,
HARRY D. KILGORE.